United States Patent
Carroll

(10) Patent No.: US 6,628,019 B2
(45) Date of Patent: *Sep. 30, 2003

(54) HIGH EFFICIENCY PNEUMATICALLY DRIVEN ELECTRIC POWER GENERATOR

(75) Inventor: John B. Carroll, Irwin, PA (US)

(73) Assignee: Westinghouse Air Brake Technologies Corporation, Wilmerding, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/358,206

(22) Filed: Jul. 21, 1999

(65) Prior Publication Data

US 2002/0047324 A1 Apr. 25, 2002

(51) Int. Cl.[7] .......................... H02K 33/00; H02K 41/00
(52) U.S. Cl. .............................. 310/30; 310/17; 310/14
(58) Field of Search ........................ 310/28, 30, 67 R, 310/12, 14, 15, 16, 17, 20, 21, 23, 36, 37

(56) References Cited

U.S. PATENT DOCUMENTS

| | | | | |
|---|---|---|---|---|
| 3,661,051 A | * | 5/1972 | Dunne et al. ................. | 395/80 |
| 4,215,297 A | * | 7/1980 | Jacquemet ..................... | 310/30 |
| 4,352,645 A | * | 10/1982 | Meyer ............................ | 310/30 |
| 4,697,113 A | * | 9/1987 | Young ........................... | 310/15 |
| 5,146,124 A | * | 9/1992 | Higham et al. ................ | 310/17 |
| 5,347,186 A | * | 9/1994 | Konotchick ................... | 310/17 |
| 5,350,222 A | * | 9/1994 | Carroll .......................... | 303/82 |
| 5,451,727 A | * | 9/1995 | Park ............................. | 181/229 |
| 5,559,378 A | * | 9/1996 | Oudet et al. ................... | 310/17 |
| 5,826,952 A | * | 10/1998 | Feigel et al. ............. | 303/119.2 |
| 5,890,460 A | * | 4/1999 | Ball et al. ................... | 123/41.7 |
| 5,945,749 A | * | 8/1999 | Li ................................ | 310/15 |

FOREIGN PATENT DOCUMENTS

DE          2355728 A    *  5/1975

OTHER PUBLICATIONS

Electric Motors and Motor Controls; Jeff Keljik; 1995; Delmar Publishers; pp. 139–142.*

* cited by examiner

*Primary Examiner*—Nestor Ramirez
*Assistant Examiner*—Guillermo Perez
(74) *Attorney, Agent, or Firm*—James Ray & Associates

(57) ABSTRACT

A pneumatically driven electric power generator includes a cylinder having one end connected to an air supply passage for receiving pressurized air and a piston having an associated magnetic moment. A portion of the piston is free to move into and out of the open end of the cylinder. An O-ring prevents airflow between the piston and the cylinder when a portion of the piston is located within the cylinder. A spring forces the piston from a position outside of the cylinder to a position inside the cylinder, so that the piston oscillates, moving into and out of the cylinder, driven by air supplied through the air supply passage. One or more electric coils are placed to enclose changing magnetic flux caused by the magnetic moment associated with the oscillating piston whereby an emf is generated in the coil(s) so that an external circuit connected to the coil(s) to complete a circuit through the coil(s) may receive electric power from the coil(s).

21 Claims, 9 Drawing Sheets

HIGH EFFICIENCY PNEUMATICALLY DRIVEN ELECTRIC POWER GENERATOR

FIELD OF THE INVENTION

The present invention relates, in general, to pneumatically driven electric power generators and, more particularly, the instant invention relates to electric power generators for railway vehicles.

BACKGROUND OF THE INVENTION

The classical railroad airbrake system which was derived from the Westinghouse airbrake has, in recent years, been augmented by introducing electrical controls, while maintaining the reliability inherent in the fundamental pneumatic portions of the classical airbrake system. These electrical control systems generally require batteries in the individual railway vehicles and it is desirable to provide a generator on each car to maintain the batteries in a charged condition. For some proposed electrically controlled pneumatic systems, a power level as small as one Watt may be sufficient. Prior art generators for railway vehicles generally employ rotary mechanical power obtained from an axle of the railway vehicle. A generator may be positioned near an axle and receive power through a V-belt or flat belt drive from a pulley on the axle. Some generators are mounted coaxially with the axle over the end of the axle bearing. Other generators use gears and clutches to extract rotary mechanical power from the axle. These generators are usually much larger, complex and expensive and are heavier than is necessary for generating a small amount of electrical power.

SUMMARY OF THE INVENTION

The invention is a pneumatically driven electric power generator which includes a cylinder having a first end connectable through an inlet flowpath to an air supply passage containing air at a positive pressure, a second end of the cylinder being open. It also has a piston having a magnetic moment, the piston being positionable in a first location wherein at least a first portion of the piston is disposed within the cylinder. Sealing means are disposed on the outer surface of the first portion of the piston or the inner surface of the cylinder to prevent loss of air between the piston and the cylinder and permit air pressure in the cylinder to increase when the first portion of the piston is disposed within the cylinder. The piston is also positionable in a second location wherein the first portion of the piston is outside of the cylinder so that clearance is provided between the piston and the cylinder so that air may exhaust from the cylinder. Means are provided for biasing the piston from the second position toward the first position so that after the cylinder has exhausted, the piston moves to the first position, whereby the piston oscillates, moving back and forth between the first position and the second position, driven by air supplied through the air supply passage to the cylinder. The invention also has at least one electric coil placed to enclose changing magnetic flux caused by the magnetic moment associated with the piston whereby an emf is generated in the electric coil, so that an external circuit connected to the electric coil receives electric power from the electric coil.

In another aspect, the invention is a pneumatically driven electric power generator which includes a first cylinder having a first end connectable through a first inlet flowpath to an air supply passage, a second end of the first cylinder being open. It also has a second cylinder having a first end connectable through a second inlet flowpath to said air supply passage, a second end of the second cylinder being open. The invention includes a piston having a magnetic moment associated therewith, the piston having a first end portion and a second end portion. The piston is positionable in a first location wherein the first end portion of the piston is disposed within the first cylinder and the second end portion of the piston is disposed outside of the second cylinder. It is also positionable in a second location wherein the second end portion of the piston is disposed within the second cylinder and the first portion of the piston is outside of the first cylinder. When the piston is disposed in the first position, air pressure received in the first cylinder through the first inlet flowpath drives the piston toward the second position, whereupon the first cylinder exhausts. Likewise, when the piston is disposed in the second position, air pressure received in the second cylinder through the second inlet flowpath drives the piston toward the first position, whereupon the second cylinder exhausts, so that the piston oscillates. At least one electric coil is placed to enclose changing magnetic flux caused by the magnetic moment associated with the piston whereby an emf is generated in the coil, so that an external circuit connected to the coil receives electric power from the coil.

OBJECTS OF THE INVENTION

It is, therefore, one of the primary objects of the present invention to provide a simple and inexpensive generator for supplying electrical power for a railway vehicle.

Another object of the present invention is to provide a small and lightweight generator for supplying electrical power for a railway vehicle.

Still another object of the present invention is to provide an electric power generator for a railway vehicle which does not require gears and clutches to extract rotary mechanical power from an axle of the railway vehicle.

An additional object of the present invention is to provide an electric power generator for a railway vehicle which does not require a belt drive for extracting rotary mechanical power from an axle of the railway vehicle.

A further object of the present invention is to provide a small electric power generator employing a brake airline as an air supply and using so little air that even when such a generator is on all the railway vehicles in a long freight train, the air used does not seriously add to the airline leakage rate.

Yet another object of the present invention is to provide an electric power generator for a railway vehicle which does not need to be mounted on a truck of the railway vehicle.

Still another object of the present invention is to provide an electric power generator for a railway vehicle which may be mounted anywhere on the railway vehicle.

In addition to the various objects and advantages of the present invention which have been generally described above, there will be various other objects and advantages of the invention that will become more readily apparent to those persons who are skilled in the relevant art from the following more detailed description of such invention, particularly, when such detailed description is taken in conjunction with the attached drawing figures and with the appended claims.

Figure 1:
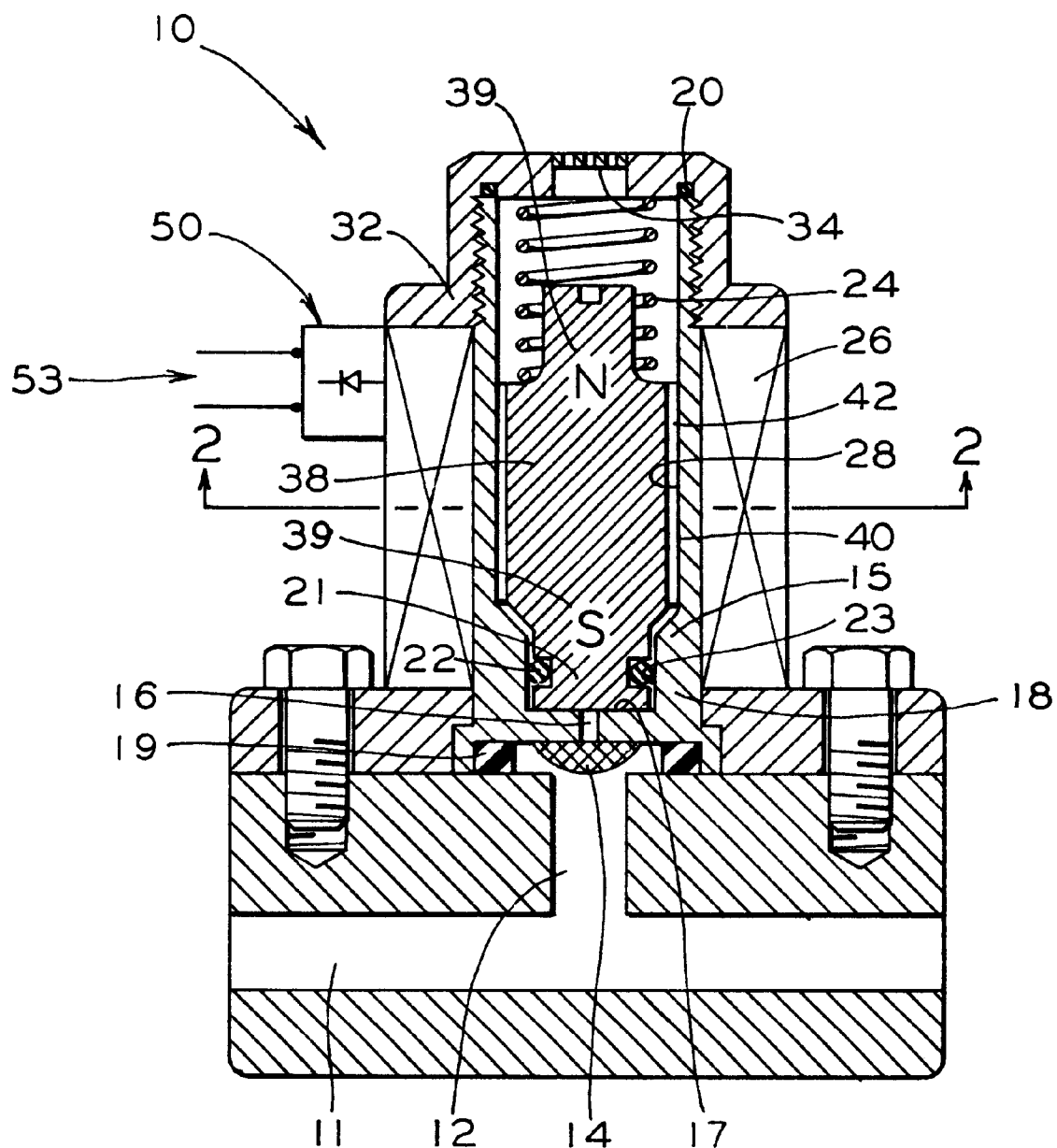
FIG. 1 is a schematic section of the invention with the piston located within the cylinder.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components having identical functions have been identified with identical reference numerals throughout the several views illustrated in the drawing figures, for the sake of clarity and understanding of the invention.

Figure 3:
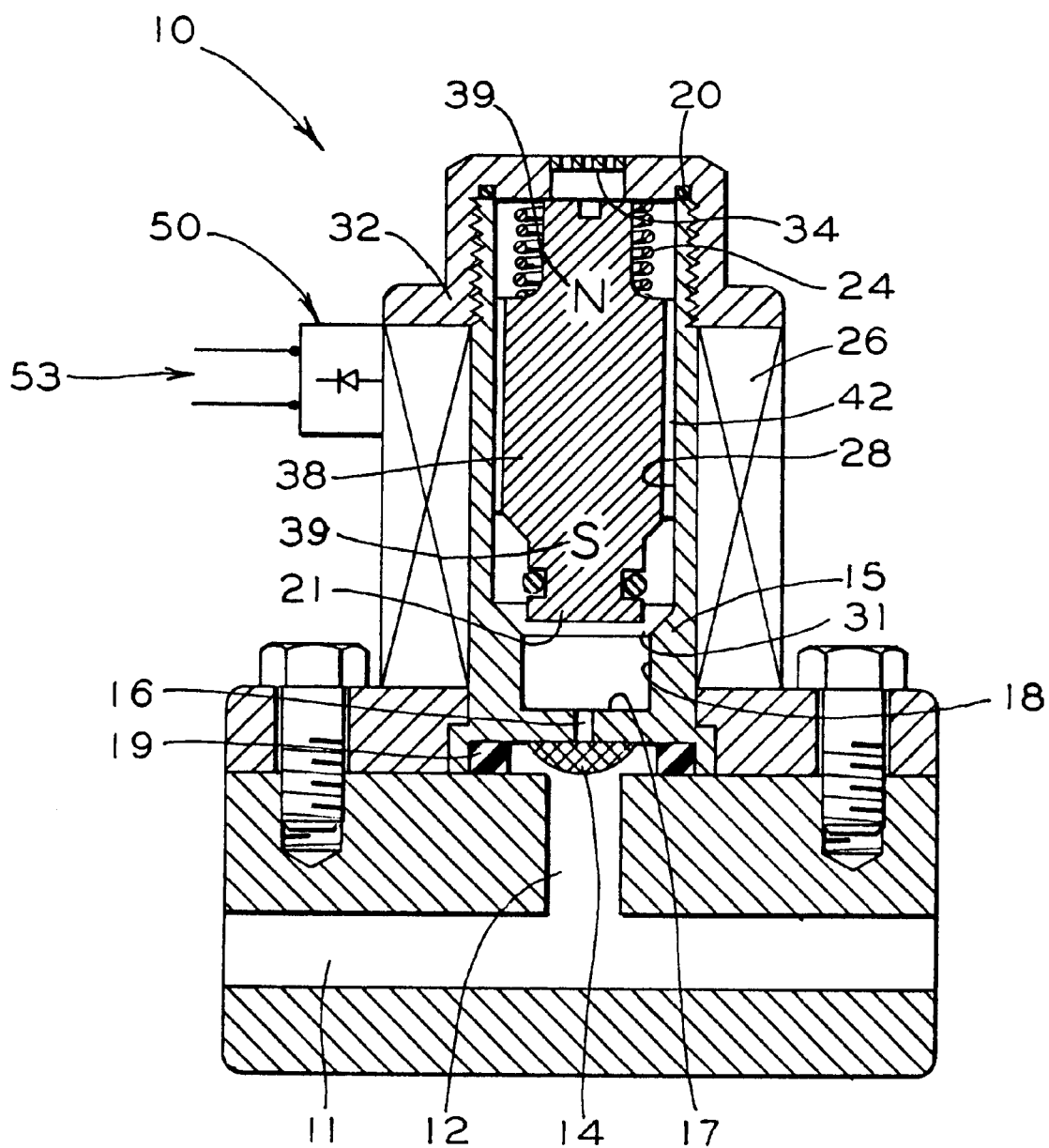
FIG. 3 is a section of the invention when the piston is outside of the cylinder.

Attention is directed to FIG. 1 which is a schematic median section of the invention. The pneumatically driven electric power generator, generally designated 10, has a piston 21 and a cylinder 18. Piston 21 is free to move in and out of cylinder 18. FIG. 1 shows piston 21 disposed in cylinder 18 and FIG. 3 shows piston 21 outside of cylinder 18. During operation, piston 21 moves cyclically between the position shown in FIG. 1 and the position shown in FIG. 3. A seal, preferably O-ring 22, is provided to prevent airflow between piston 21 and cylinder 18 when piston 21 is disposed within cylinder 18. In the presently preferred embodiment, O-ring 22 is mounted in a groove 23 in piston 21. Alternatively, an O-ring may be mounted in a groove (not shown) in an inner surface of cylinder 18.

Generator 10 is energized by pressurized air received through inlet flow path, generally designated 30, from an air supply passage 12. Supply passage 12 may be connected to a conduit 11 which contains pressurized air. Conduit 11 may, for example, be the brake air line of a railway vehicle. Inlet flow path 30 is in fluid communication with cylinder 18 at a first end 17 of cylinder 18. Preferably, a filter 14 is included in inlet flow path 30 to keep dirt out of generator 10. Also, a choke 16 is, preferably, included in inlet flow path 30 to control the pneumatic impedance of inlet flow path 30.

When piston 21 is disposed in cylinder 18 and air is supplied through inlet flow path 30, air pressure rises in cylinder 18 and forces piston 21 out of cylinder 18 to the position shown in FIG. 3. In this position, there is a gap 31 between piston 21 and cylinder 18. The pressure of air in cylinder 18 then drops and spring 24 forces piston 21 back into cylinder 18. This cycle is repeated, so piston 21 oscillates, moving in and out of cylinder 18. Piston 21 has a magnetic moment associated therewith, as suggested by indicia 39. At least one electric coil 26 experiences an induced emf due to the changing magnetic flux caused by the oscillating magnetized piston 21. Coil 26 preferably is connected to a rectifier 50 to convert the alternating emf provided by coil(s) 26 to DC electric power on terminals 53. The DC power available on terminals 53 may be used to power a battery (not shown) and/or to power electronic systems (not shown) on a railway vehicle (not shown).

It is preferred that generator 10 have a cylinder extension 28 attached to second end 15 of cylinder 18. Preferably, cylinder extension 28 is formed integrally with cylinder 18. Cylinder extension 28 has a larger inside diameter than cylinder 18. It is preferred that generator 10 also have an end closure 32 which may be a hex cap nut. Preferably, end closure 32 has an exhaust passage 34.

Figure 2:
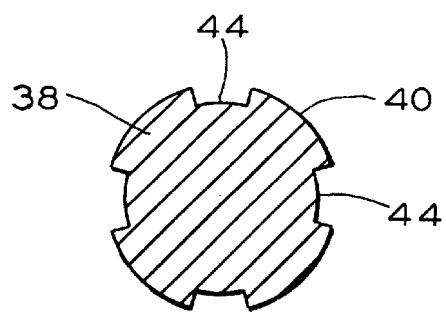
FIG. 2 is a cross section of the piston extension.
Figure 1A:
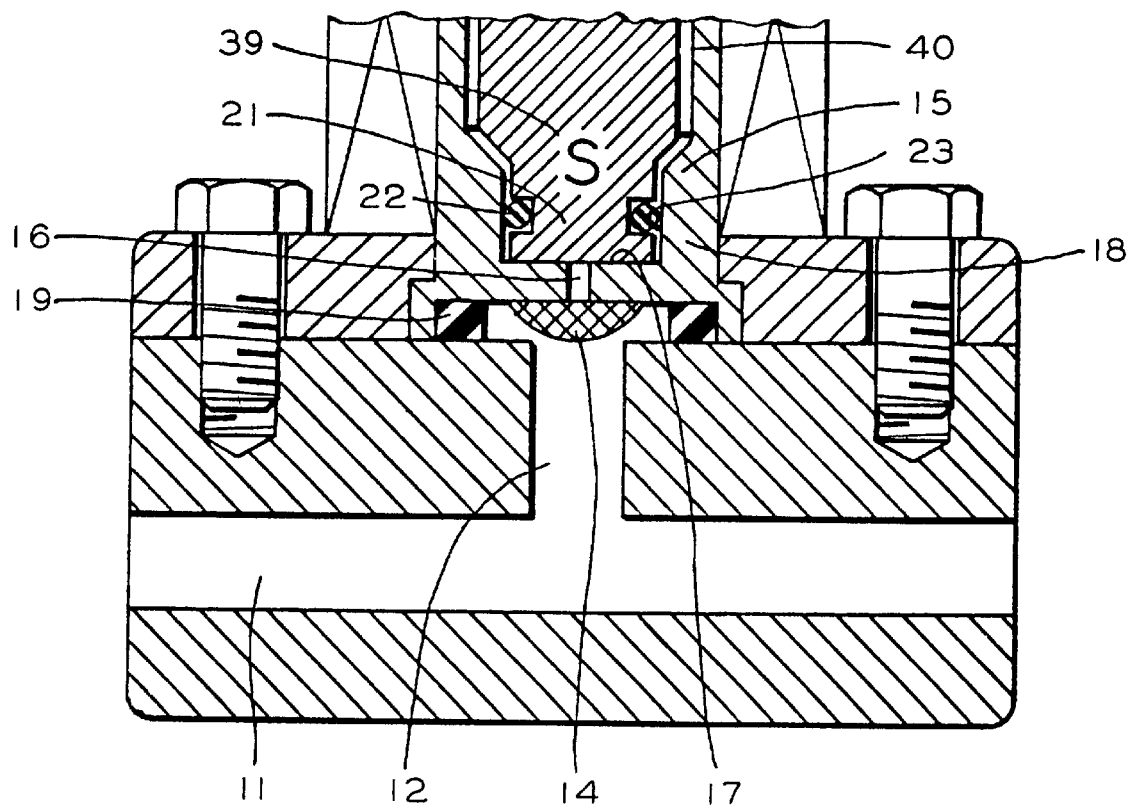
FIG. 1A is a detail of the inlet flowpath.
Figure 4:
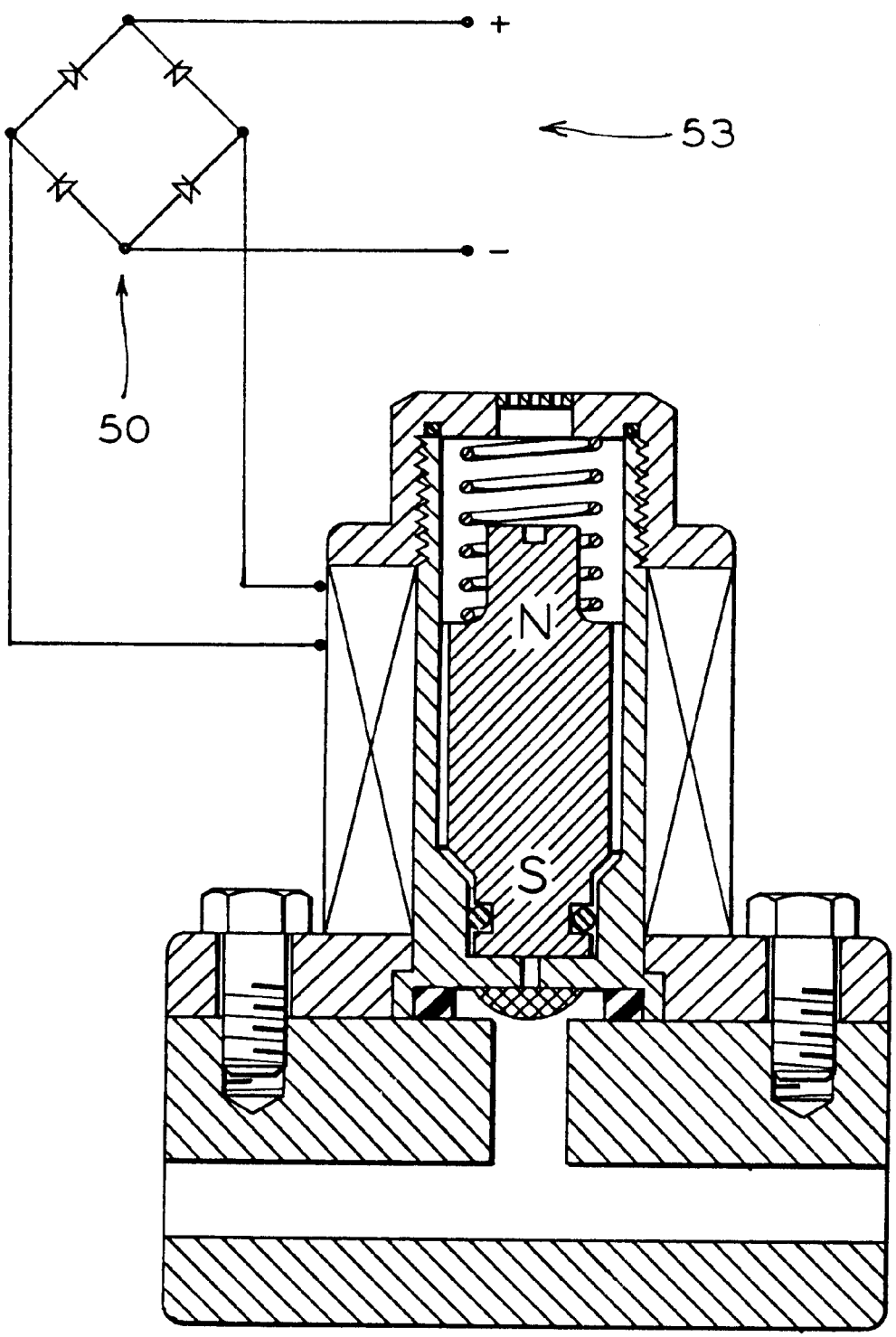
FIG. 4 is a schematic of the invention with a full bridge rectifier.

It is also preferred that generator 10 have a piston extension 38, preferably formed integrally with piston 21. A cross section of piston extension 38 is shown in FIG. 2, cut along section 2—2 in FIG. 1. Piston extension 38 has outer surfaces 40 to fit slidably within cylinder extension 28 at inner surface 42 of cylinder extension 28. Piston extension surface 40 and cylinder extension inner surface 42 should be smooth and at least one of them may be coated with or formed of a low friction material such as Teflon®. Piston extension 38 has at least one longitudinal air passage, preferably a plurality of slots 44, to permit air to flow past piston extension 38 to exhaust 34. A seal 19 is recommended to prevent air loss from supply passage 12 and a seal 20 can be provided to prevent air loss between end closure 32 and cylinder extension 28. It is preferred that rectifier 50 be a full bridge rectifier as shown in FIG. 4. Rectifier 50 supplies DC power to rectifier output terminals 53.

Figure 5:
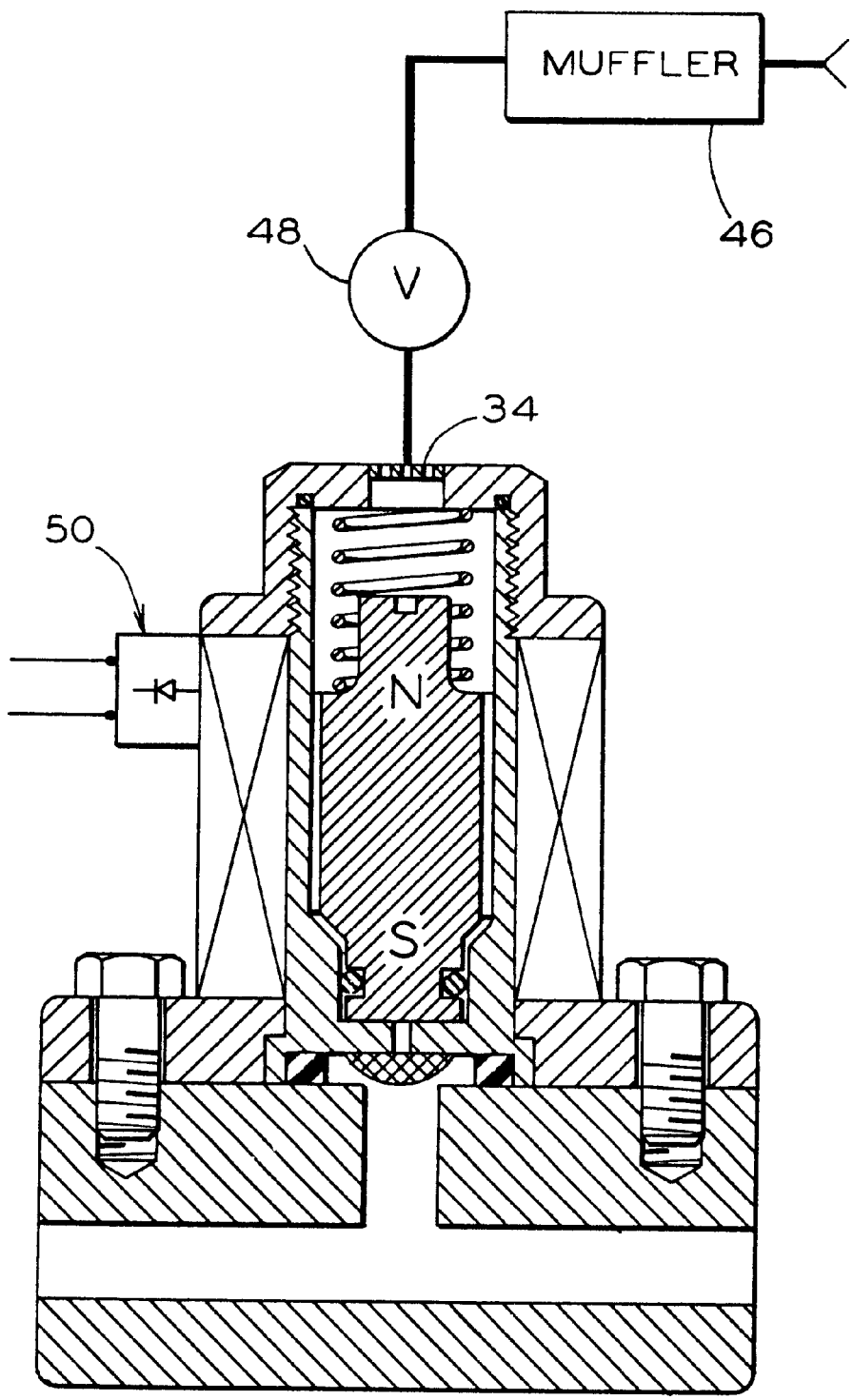
FIG. 5 is a schematic of the invention with an electrically controlled exhaust valve and a muffler.
Figure 6:
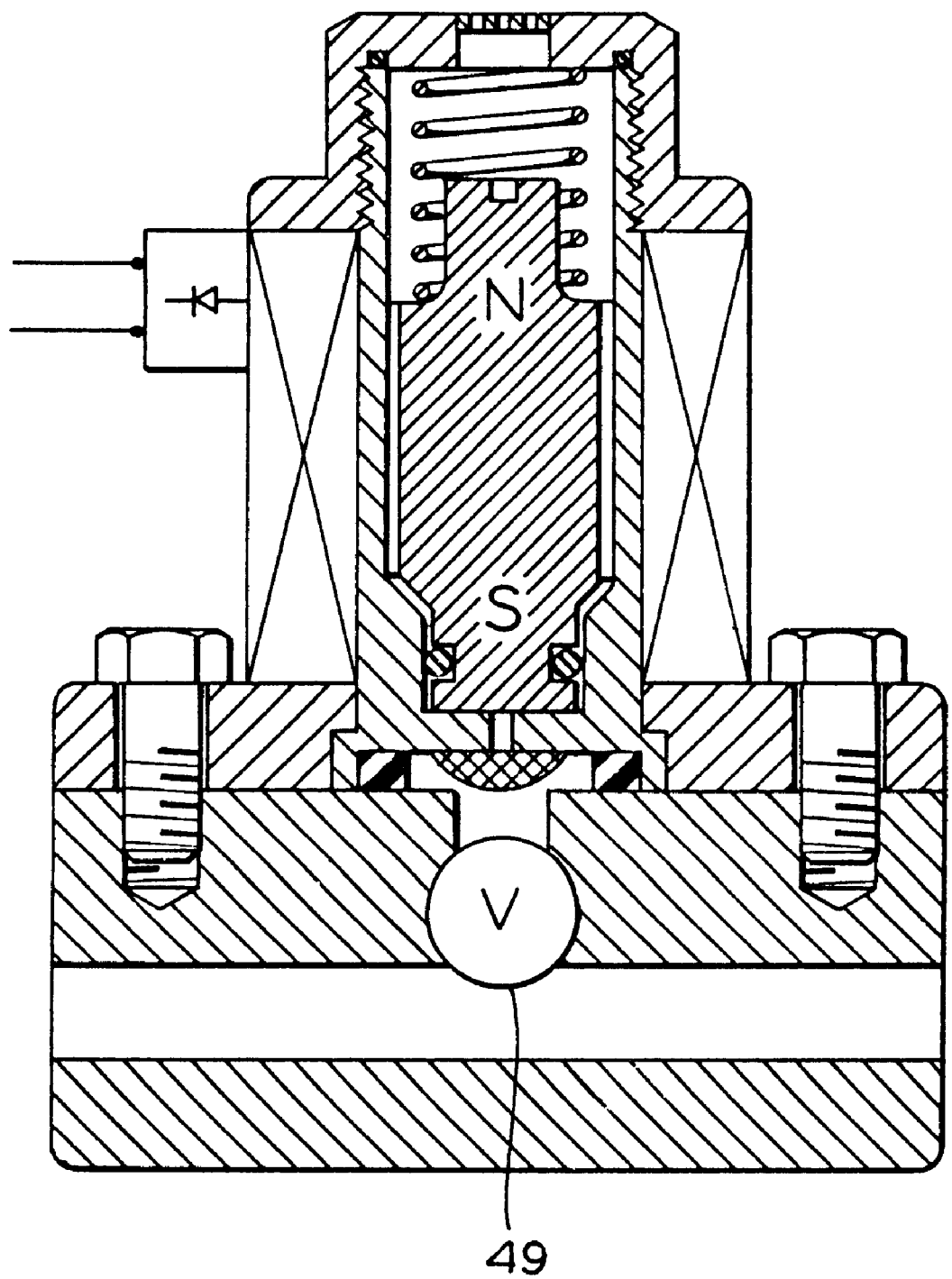
FIG. 6 is a schematic of the invention with an electrically controlled inlet valve.

FIGS. 5 and 6 show valves for preventing air flow through generator 10 to thereby shut down generator 10. This may be done to prevent overcharging of a battery energized by the generator, or to prevent unnecessary loss of air or unnecessary wear of generator 10. FIG. 5 shows a valve 48 connected to the exhaust passage 34 and FIG. 6 shows a valve 49 on the supply passage 12. Valve 48 or valve 49 would typically be controlled by a voltage regulator (not shown) to protect the battery (not shown) from overcharging. FIG. 5 also shows a muffler 46 which, preferably, is included to reduce noise produced by generator 10.

Figure 7:
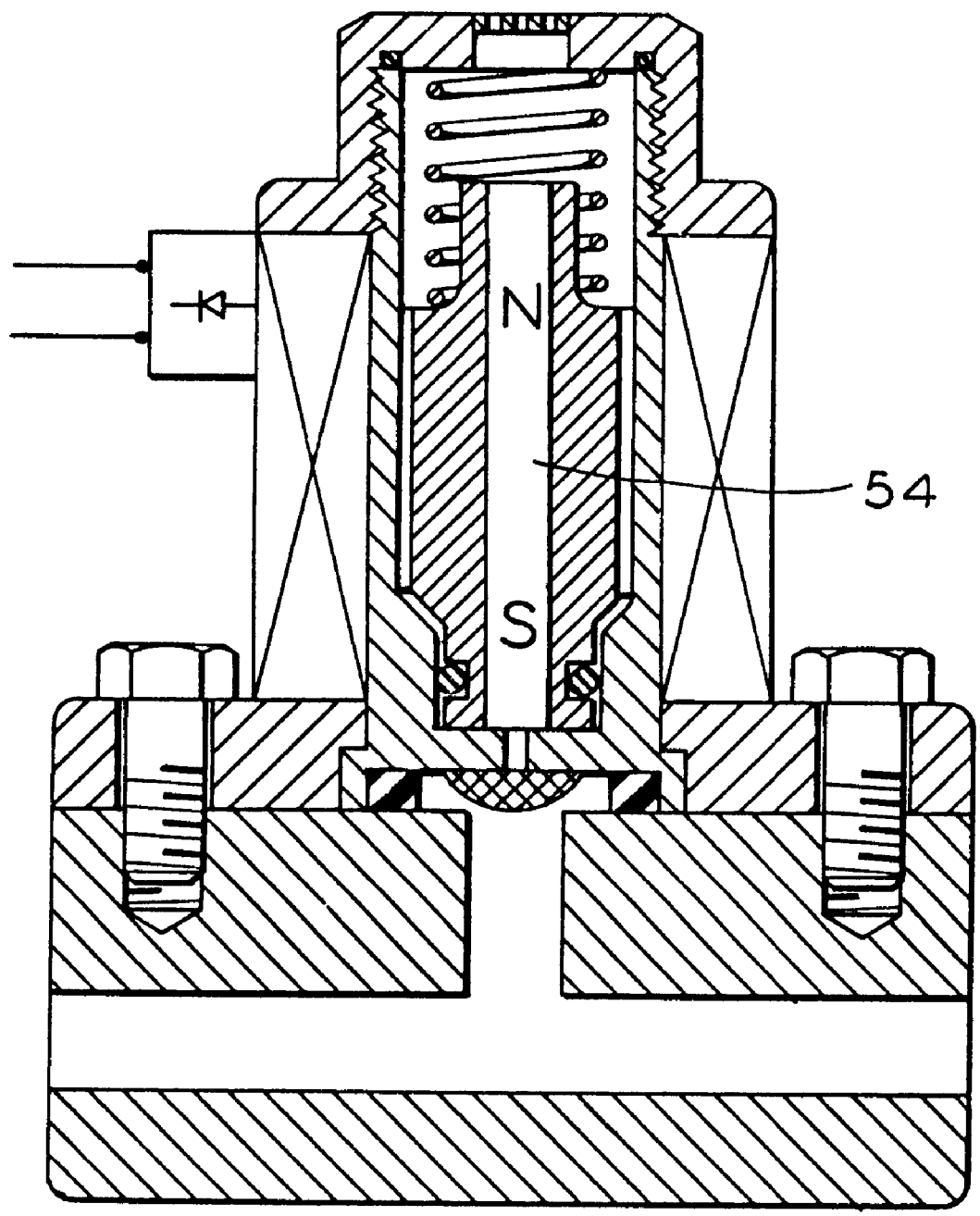
FIG. 7 illustrates the invention with a magnet attached to the piston.

It is preferred that piston extension 38 and piston 21 be made principally of a magnetic material. Alternatively, a magnetic moment in accordance with indicia 39 may be provided by a bar magnet 54 shown in FIG. 7. Bar magnet 54 is attached to either piston extension 38, piston 21, or to both. Needless to say, the magnetic moment associated with piston 21 and/or piston extension 38 may be reversed without affecting the operation of generator 10.

Figure 8:
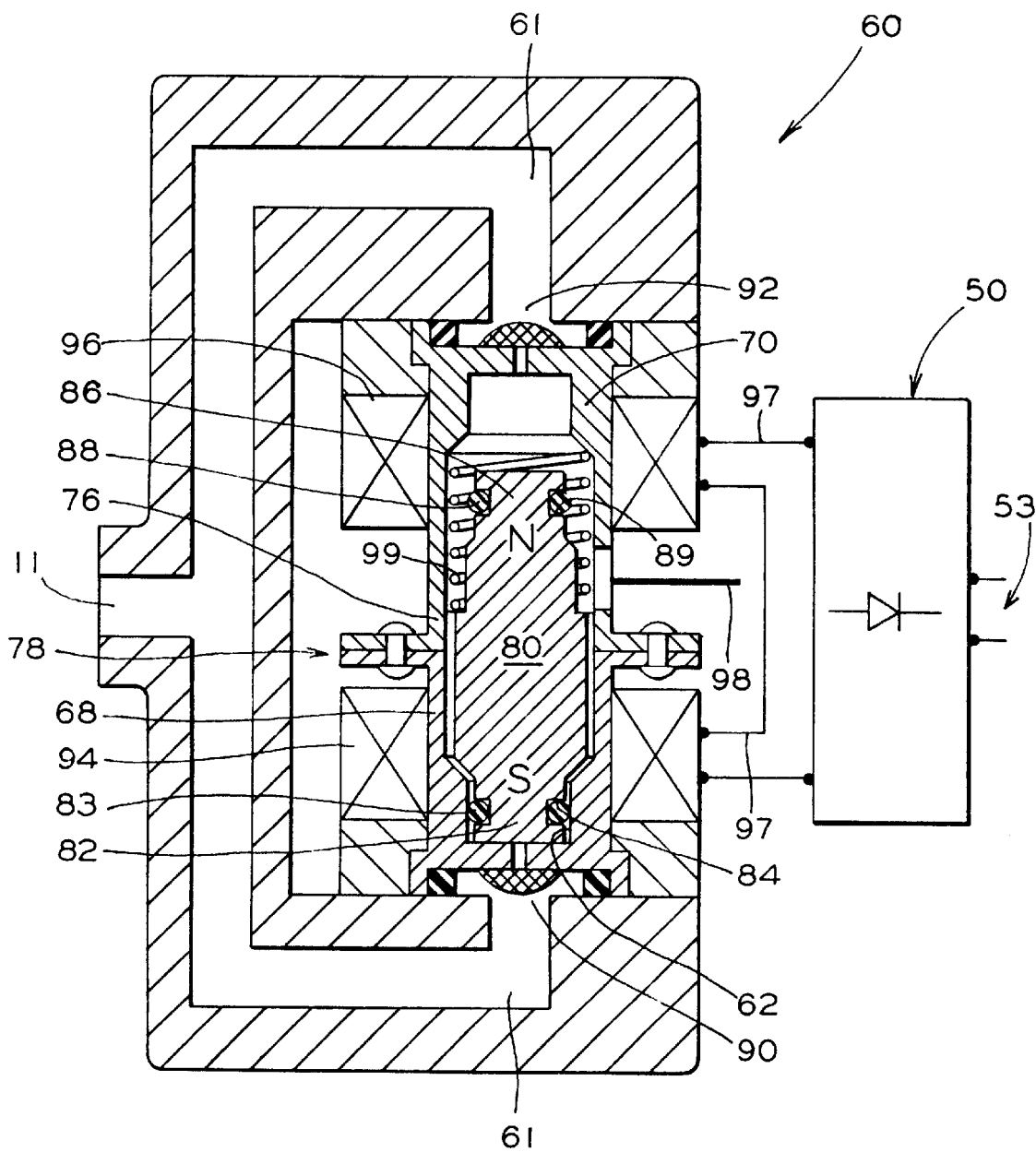
FIG. 8 is a schematic illustration of an alternate embodiment of the invention having a double ended piston.

An alternative embodiment of the invention is shown in FIG. 8, which is a generator, generally designated 60, having a double ended configuration. Generator 60 has a first cylinder 62 and a second cylinder 70. First cylinder 62 receives air through first inlet flowpath 90 from air supply passage 61. Air supply passage 61 is for connection to a conduit (not shown in this figure) carrying pressurized air. Second cylinder 70 receives air through second inlet flowpath 92 from air supply passage 61.

Generator 60 has a piston 80 having a first end portion 82 and a second end portion 86. Piston 80 is free to move between the position shown in FIG. 8 wherein first end portion 82 of piston 80 is in first cylinder 62 and a reciprocal position shown in FIG. 9 wherein second end portion 86 of piston 80 is in second cylinder 70.

When first end portion 82 of piston 80 is in first cylinder 62, it is sealed against first cylinder 62, preferably, by O-ring 83 in groove 84. Likewise, when second end portion 86 of piston 80 is in second cylinder 70, it is sealed against second cylinder 70, preferably, by O-ring 88 in groove 89.

During operation of generator 60, when first end portion 82 of piston 80 is in first cylinder 62, as shown in FIG. 8, pressurized air received through first inlet flowpath 90 from passage 61 increases the pressure in first cylinder 62. The increased pressure in first cylinder 62 forces piston 80 so that first end portion 82 of piston 80 moves out of first cylinder 62. Piston 80 is then in the position shown in FIG. 9 and the pressure in first cylinder 62 drops.

Figure 9:
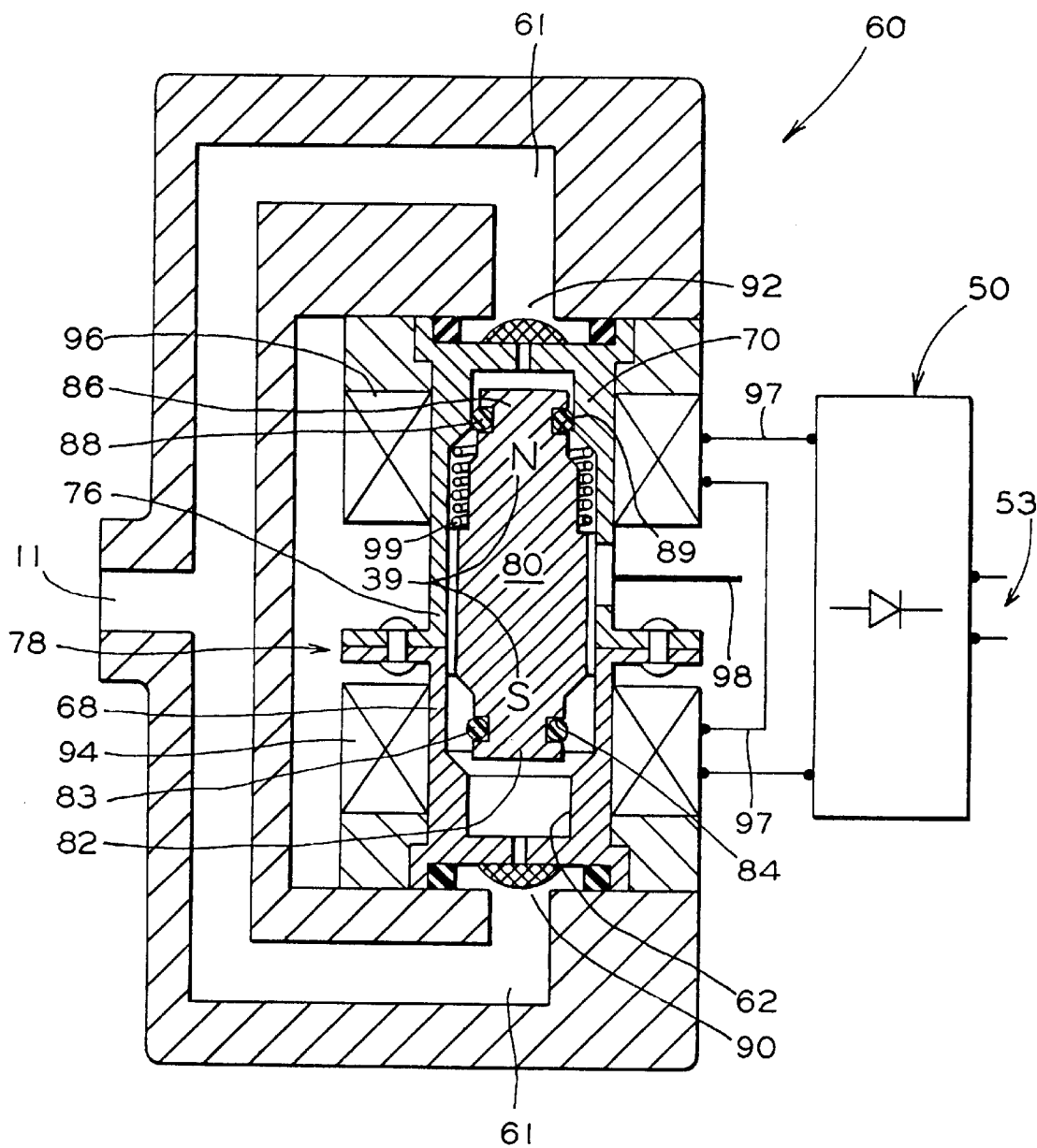
FIG. 9 illustrates the alternate embodiment with the double ended piston located with its second end in the second cylinder.

As is clearly evident in both FIGS. 8 and 9 that exhaust 98 is a common exhaust for both cylinders. So that when first end portion 82 of piston 80 is forced out of first cylinder 62, the second end portion 86 of piston 80 enters second cylinder 70, as shown in FIG. 9. In this position pressurized air from such first cylinder 62 is exhausted through exhaust 98. Pressurized air from the second inlet flowpath 92 from passage 61 then increases the pressure in the second cylinder 70 and forces piston 80 so that first end portion 82 moves back into the first cylinder 62, as shown in FIG. 8. Pressurized air from the second cylinder 70 is now exhausted through exhaust 98.

When first end portion 82 of piston 80 is forced out of first cylinder 62, the second end portion 86 of piston 80 enters second cylinder 70, as shown in FIG. 9. Pressurized air received through second inlet flowpath 92 from passage 61 then increases the pressure in second cylinder 70 and forces piston 80 so that the first end portion 82 of piston 80 moves back into the first cylinder 62, as shown in FIG. 8. Thus the cycle repeats, piston 80 oscillating between the two positions. Piston 80 has a magnetic moment, as indicated by indicia 39. It is preferred that generator 60 have two coils 94 and 96 connected in series to rectifier 50. A person skilled in the art will recognize that leads 97 should be connected in the manner which maximizes the emf applied to rectifier 50.

In the presently preferred embodiment shown, a first cylinder extension 68 is formed integrally with first cylinder 62. Likewise, a second cylinder extension 76 is formed integrally with second cylinder 70. First cylinder extension 68 is connected to second cylinder extension 76 at attachment 78. Attachment 78 is preferably provided to facilitate assembly and maintenance of generator 60. A gasket or other seal (not shown) may be provided at attachment 78 to prevent leakage.

It is preferred that a spring 99 engaging piston 80 be provided to facilitate starting. Spring 99 positions piston 80 so that first end portion 82 of piston 80 is in first cylinder 62. Introduction of pressurized air through first inlet flowpath 90 increases the pressure of first cylinder 62 to move piston 80 so that oscillation of piston 80 commences.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:
1. A pneumatically driven electric power generator comprising:
    a single cylinder having a first end connectable through a single inlet flowpath to an air supply passage containing air at a positive pressure, a second end of said cylinder being open;
    a cylinder extension at least one of formed integrally with and attached to said single cylinder, said cylinder extension having an inner surface having a transverse dimension greater than a transverse dimension of said single cylinder, said cylinder extension including a threaded portion adjacent one end thereof;
    an end closure threadably connected to an end of said cylinder extension;
    a single piston having a magnetic moment associated therewith, said piston being positionable in a first location wherein at least a first portion of said piston is disposed within said cylinder and in a second location wherein said first portion of said single piston is outside of said single cylinder so that clearance is provided between said single cylinder so that air may exhaust from said single cylinder;
    sealing means disposed on at least one of an outer surface of said first portion of said single piston and an inner surface of said mingle cylinder to prevent loss of air between said single piston and said single cylinder and permit air pressure in said single cylinder to increase when said first portion of said single piston is disposed within said single cylinder;
    a single biasing means caged between a ledge portion adjacent one end of said single piston and an inner surf ace of said end closure for moving said single piston from said second position toward said first position so that after said single cylinder has substantially exhausted, said single piston moves to said first position, whereby said single piston oscillates, moving back and forth between said first position and said second position, driven alternately by air supplied through such air supply passage to said single cylinder and by said biasing means; and
    at least one electric coil placed to enclose changing magnetic flux caused by said magnetic moment associated with said piston whereby an emf is generated in said electric coil, so that an external circuit connected to said electric coil receives electric power from said electric coil.

2. A pneumatically driven electric power generator, according to claim 1, wherein said sealing means is an O-ring in a groove formed on said outer surface of said first portion of said piston.

3. A pneumatically driven electric generato,r according to claim 1, wherein said inlet flowpath includes an air filter for excluding foreign material from said cylinder.

4. A pneumatically driven electric power generator, according to claim 1, wherein said inlet flowpath includes a choke to control an impedance of said inlet flowpath.

5. A pneumatically driven electric power generator, according to claim 1, wherein said generator further includes an exhaust passage connected to at least one of said cylinder extension and said end closure.

6. A pneumatically driven electric power generator, according to claim 5, wherein said piston further includes a piston extension at least one of formed integrally with and attached to said piston, at least a portion of said piston extension contacting at least a portion of said cylinder extension to provide positional constraint to said piston.

7. A pneumatically driven electric power generator, according to claim 6, wherein said portion of said piston extension contacting at least a portion of said cylinder extension is an outer surface of said piston extension and said portion of said cylinder extension is an inner surface of said cylinder extension.

8. A pneumatically driven electric power generator, according to claim 7, wherein at least one of said outer surface of said piston extension and said inner surface of said cylinder extension is at least one of made from and coated with a low friction material.

9. A pneumatically driven electric power generator, according to claim 6, wherein said piston extension has at least one longitudinal air passage to carry air to an end of said piston adjacent said end closure, said exhaust being connected to said end closure.

10. A pneumatically driven electric power generator, according to claim 9, wherein said at least one longitudinal air passage is a longitudinal slot formed in said outer surface of said piston extension.

11. A pneumatically driven electric power generator, according to claim 6, wherein said magnetic moment associated with said piston is provided by a magnet attached to at least one of said piston and said piston extension.

12. A pneumatically driven electric power generator, according to claim 6, wherein said magnetic moment associated with said piston is provided by forming at least one of said piston and said piston extension of a material having a magnetic moment.

13. A pneumatically driven electric power generator, according to claim 5, wherein said exhaust passage includes a muffler to reduce noise released from said generator.

14. A pneumatically driven electric power generator, according to claim 5, wherein said exhaust passage includes an electrically actuated shutoff valve to prevent air flow through said generator, thereby turning off said generator.

15. A pneumatically driven electric power generator, according to claim 1, wherein said biasing means is a spring.

16. A pneumatically driven electric power generator, according to claim 15, wherein said spring is a compression spring disposed between said piston extension and said end closure.

17. A pneumatically driven electric power generator, according to claim 1, wherein said inlet flowpath includes an electrically actuated shutoff valve to prevent air flow through said generator, thereby turning off said generator.

18. A pneumatically driven electric power generator, according to claim 1, wherein said at least one electric coil is connected to a rectifier to supply DC electric power.

19. A pneumatically driven electric power generator, according to claim 18, wherein said rectifier is a full bridge rectifier to supply DC electric power whenever a net flux through said at least one electric coil is changing.

20. A pneumatically driven electric power generator comprising:
   a first cylinder having a first end connectable through a first inlet flowpath to an air supply passage, a second end of said first cylinder being open;
   a first cylinder extension at least one of formed integrally with and attached to said first cylinder, said first cylinder extension having an inner surface having a transverse dimension greater than a transverse dimension of said first cylinder;
   a second cylinder having a first end connectable through a second inlet flowpath to said air supply passage, a second end of said second cylinder being open;
   a second cylinder extension at least one of formed integrally with and attached to said second cylinder, said second cylinder extension having an inner surface having a transverse dimension greater than a transverse dimension of said second cylinder;
   a means for connecting said first cylinder extension and said second cylinder extension;
   a common exhaust for said first cylinder and said second cylinder;
   a single piston having a magnetic moment associated therewith, said single piston having a first end portion and a second end portion, said single piston being positionable in a first location wherein said first end portion of said single piston is disposed within said first cylinder and said second end portion of said single piston is disposed outside of said ascend cylinder, said single piston further being positionable in a second location wherein said second end portion of said single piston is disposed within said second cylinder and said first portion of said single piston is outside of said first cylinder;
   so that when said single piston is disposed in said first position, air pressure received in said first cylinder through said first inlet flowpath drives said single piston toward said second position, whereupon said first cylinder exhausts, and when said single piston is disposed in said second position, air pressure received in said second cylinder through said second inlet flowpath drives said single piston toward said first position, whereupon said second cylinder exhausts, so that said single piston oscillates; and
   at least one electric coil placed to enclose changing magnetic flux caused by said magnetic moment associated with said piston whereby an emf is generated in said electric coil, so that an external circuit connected to said electric coil receives electric power from said electric coil.

21. A pneumatically driven electric power generator, according to claim 20, wherein said generator further includes a spring engaging said piston to bias said piston toward one of said first position and said second position to facilitate starting said generator when air is supplied through said first air supply passage and said second air supply passage.

* * * * *